(12) United States Patent
Szymbor et al.

(10) Patent No.: US 7,340,816 B2
(45) Date of Patent: *Mar. 11, 2008

(54) BRISTLE ARRANGEMENT FOR BRUSH SEAL, METHOD AND ASSEMBLY FOR MAKING SAME, AND METHOD OF MAKING BRUSH SEAL

(75) Inventors: John A. Szymbor, Sanford, ME (US); Glenn D. Sparks, Saco, ME (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/200,277

(22) Filed: Aug. 9, 2005

(65) Prior Publication Data

US 2005/0285346 A1 Dec. 29, 2005

Related U.S. Application Data

(62) Division of application No. 10/074,191, filed on Feb. 12, 2002.

(51) Int. Cl.
*B23Q 3/00* (2006.01)

(52) U.S. Cl. .......................................... 29/467; 29/466
(58) Field of Classification Search .......... 29/464–468, 29/559; 277/335; 300/18, 21
See application file for complete search history.

(56) References Cited

U.S. PATENT DOCUMENTS 4,884,850 A * 12/1989 Greer .......................... 300/21

* cited by examiner

*Primary Examiner*—David P. Bryant
*Assistant Examiner*—Christopher M Koehler
(74) *Attorney, Agent, or Firm*—Bachman & LaPointe

(57) ABSTRACT

A bristle arrangement for use in a brush seal, comprising: a plurality of bristles arranged in a length; and a joint along the length securing the bristles together. The fixture for making the bristle arrangement, comprises: a base having a surface with an arrangement of guides thereon, the guides adapted to orient the tufts on the surface; and a cover having a surface for receiving the tufts. The cover removably mounts to the base to sandwich the tufts between the cover and the base. Making a brush seal with multiple stages comprises the steps of: providing plates and bristle arrangements; creating a stack of plates and bristle arrangements; and joining the stack.

11 Claims, 5 Drawing Sheets

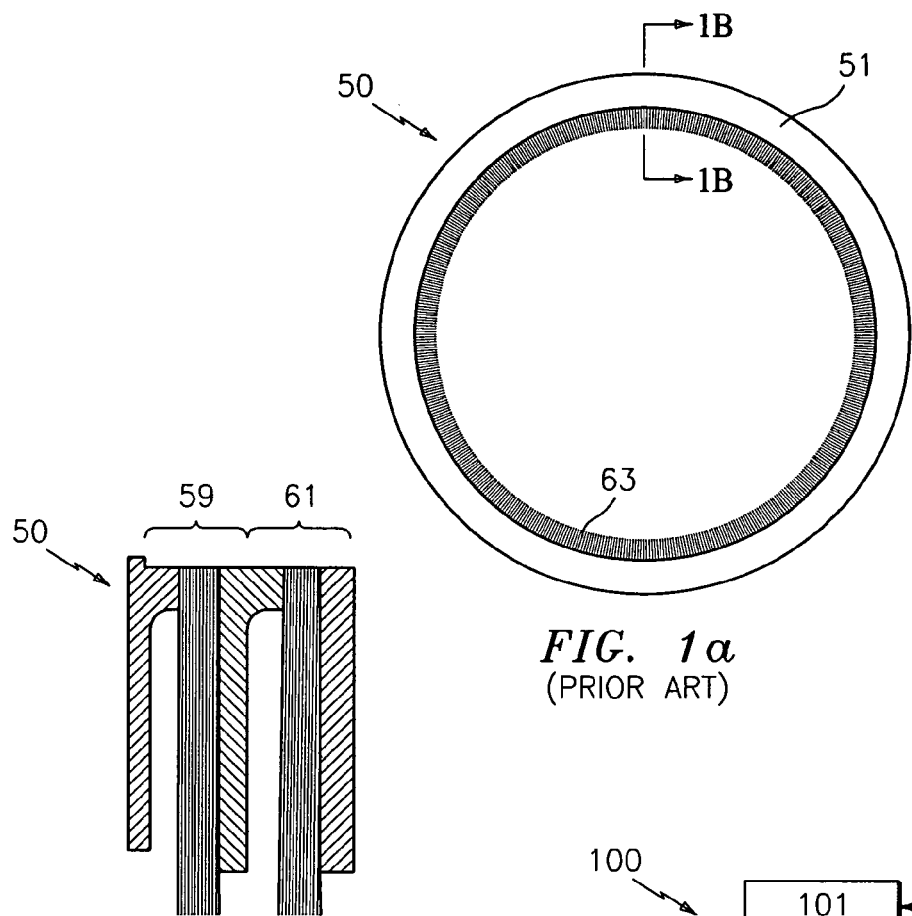
FIG. 1a
(PRIOR ART)
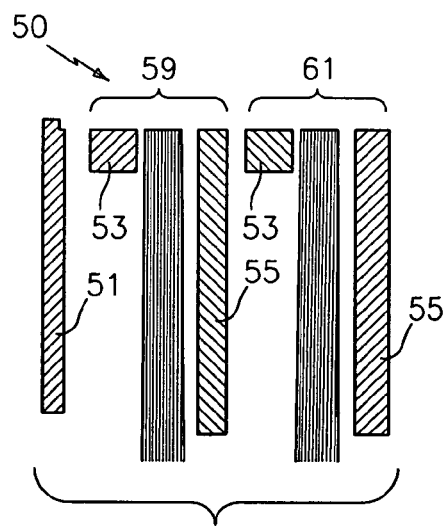
FIG. 1b
(PRIOR ART)
FIG. 1c
(PRIOR ART)
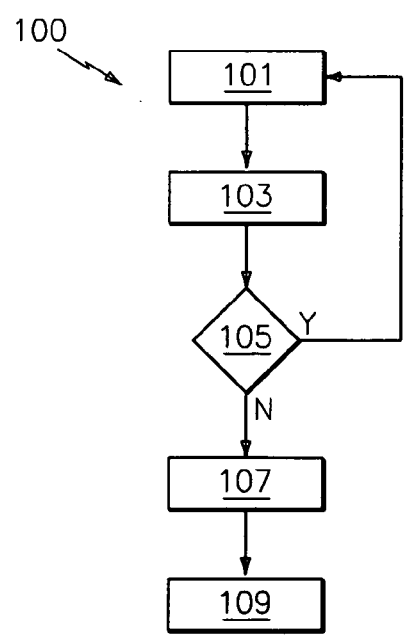
FIG. 2
(PRIOR ART)

BRISTLE ARRANGEMENT FOR BRUSH SEAL, METHOD AND ASSEMBLY FOR MAKING SAME, AND METHOD OF MAKING BRUSH SEAL

CROSS-REFERENCE TO RELATED APPLICATION(S)

This application is a divisional application of U.S. patent application Ser. No. 10/074,191, filed Feb. 12, 2002, entitled BRISTLE ARRANGEMENT FOR BRUSH SEAL, METHOD AND ASSEMBLY FOR MAKING SAME, AND METHOD OF MAKING BRUSH SEAL, By John A. Szymbor et al.

TECHNICAL FIELD

The present invention relates to brush seals. Specifically, the present invention relates to a bristle arrangement for the brush seal, to a method and assembly for making the bristle arrangement, and to a method of making the brush seal.

BACKGROUND OF THE INVENTION

Brush seals are commonly used to prevent the escape of fluid (i.e. air) through a gap between two parts. Brush seals are commonly found on gas turbine engines. In a turbine, the brush seals typically prevent secondary flow from escaping through a gap between a stationary part (e.g. a diffuser case) and a rotating part (e.g. a turbine shaft). The brush seal has other uses, such as sealing a gap between stationary parts.

A brush seal typically includes wire bundles sandwiched between plates. The plates and the wire bundles define one stage of the brush seal. To increase capability, a brush seal may have multiple stages. The multiple stages allow a greater pressure drop across the brush seal from the upstream side to the downstream side.

Unfortunately, conventional assembly methods are not well suited for multiple stage brush seals. Specifically, conventional methods cannot concurrently assemble the multiple stages of a brush seal. Rather, conventional methods separately assemble each stage of the brush seal. A subsequent step in the conventional methods then combines the discretely assembled stages to form the multiple stage brush seal.

DISCLOSURE OF THE INVENTION

It is an object of the present invention to provide a new and improved method of making a brush seal.

It is a further object of the present invention to provide a method of assembling a multiple stage brush seal with one set of fixtures.

It is a further object of the present invention to provide a method of assembling a brush seal that can concurrently build the various stages of a multiple stage brush seal.

It is a further object of the present invention to provide a new and improved brush seal made from fewer components.

It is a further object of the present invention to provide a new and improved bristle arrangement.

It is a further object of the present invention to provide a bristle arrangement that secures together all of the bristles for one stage of the brush seal.

It is a further object of the present invention to provide a new and improved method for making the bristle arrangement.

It is a further object of the present invention to provide a new and improved fixture for making the bristle arrangement.

These and other objects of the present invention are achieved in one aspect by a bristle arrangement for use in a brush seal. The bristle arrangement comprises: a plurality of bristles arranged in a length; and a joint securing the plurality of bristles together. The joint extends along the length.

These and other objects of the present invention are achieved in another aspect by method of making a bristle arrangement for a brush seal. The method comprises the steps of: arranging a plurality of bristles along a length; and joining the plurality of bristles along the length.

These and other objects of the present invention are achieved in another aspect by apparatus for making a bristle arrangement. The apparatus comprises: a base having a surface with an arrangement of guides thereon, the guides adapted to orient a plurality of tufts on the surface; and a cover having a surface for receiving the tufts. The cover removably mounts to the base to sandwich the tufts between the cover and the base.

These and other objects of the present invention are achieved in another aspect by a method of making a brush seal having multiple stages. The method comprises the steps of: providing plates and bristle arrangements; creating a stack of plates and bristle arrangements to define the multiple stages of the brush seal; and joining the stack to create the brush seal.

BRIEF DESCRIPTION OF THE DRAWINGS

Other uses and advantages of the present invention will become apparent to those skilled in the art upon reference to the specification and the drawings, in which:

FIG. 1a is a front view of a conventional multiple stage brush seal;

FIG. 1b is a cross-sectional view of the brush seal taken along line IB-IB in FIG. 1a;

FIG. 1c is an exploded, cross-sectional view showing the various components of the brush seal of FIG. 1a;

FIG. 2 is a schematic of a conventional method of assembling a multiple stage brush seal;

FIG. 3b is a cross-sectional view of the bristle arrangement taken along line IIIB-IIIB in FIG. 3a;

BEST MODE FOR CARRYING OUT THE INVENTION

Figure 3A:
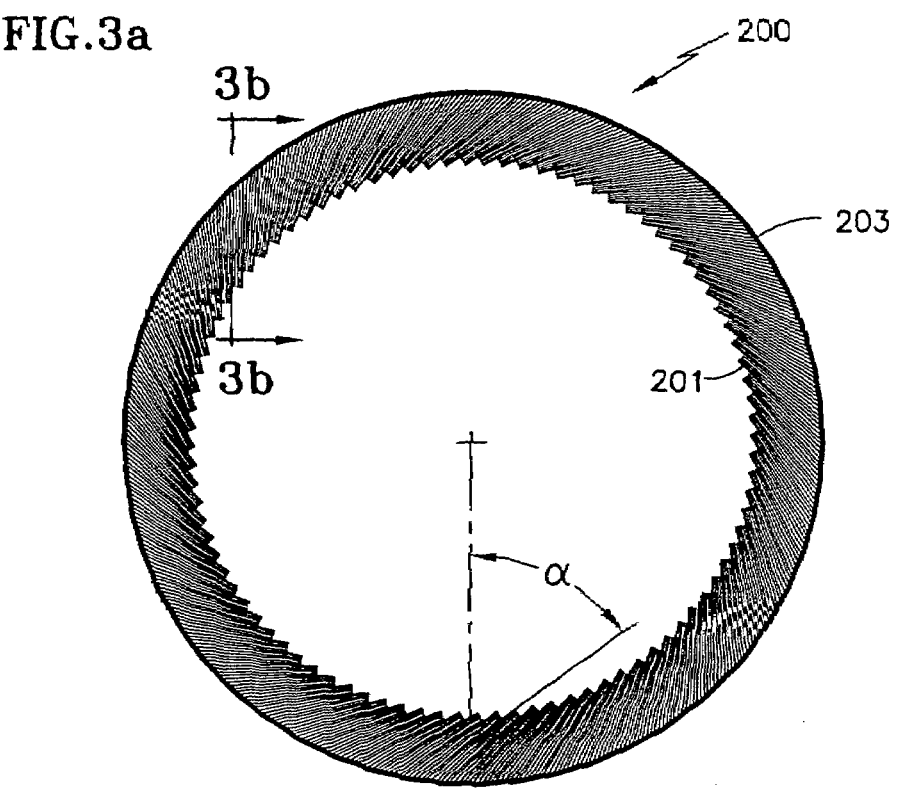
FIG. 3a is a plan view of a bristle arrangement of the present invention.

FIGS. 1a-1c display a conventional multiple stage brush seal 50. Although the figures display a two stage brush seal, the brush seal 50 could have more than two stages.

The brush seal 50 is an assembly of plates and bristles. FIG. 1c is an exploded view of all the various components that form the brush seal 50. The brush seal 50 includes a windage cover 51, side plates 53, back plates 55 and packs of bristles 63.

Each stage 59, 61 of the brush seal 50 comprises a pack of bristles 63 located between a side plate 53 and a back plate 55. The windage cover 51 resides in front, i.e. upstream, of the stages 59, 61.

FIG. 2 schematically demonstrates a conventional method 100 of assembling the multiple stage brush seal 50. The method 100 builds up the brush seal 50 by stage. A first step 101 of the method 100 assembles one such stage of the brush seal 50 within a fixture (not shown).

The operator assembles the brush seal stage as follows. The operator first places the back plate 55 within the fixture. Next, the operator places tufts of bristles 63 on the back plate 55. The operator then places the side plate 53 over the bristles 63.

To complete the first step 101, the operator uses the fixture to sandwich the various components together. Ideally, the fixture clamps the plates 53, 55 together to retain the bristles 63 therebetween. The components remain in the fixture for the next step of the conventional method 100.

A second step 103 of the method 100 bonds the brush seal stage together, such as by welding the plates 53, 55 and the pack of bristles 63. After bonding the components together, the operator can remove the brush seal stage from the fixture.

A third step 105 determines if the brush seal 50 requires the assembly of another stage. If the brush seal 50 requires another stage, the method 100 returns to the first step 101 to produce another stage. If the operator has assembled sufficient stages, the method 100 continues to the next step.

A fourth step 107 assembles the various stages 59, 61 of the brush seal 50 within another fixture (not shown). For example, the operator first places the second stage 61 within the fixture. The operator then places the first stage 59 in the fixture. Finally, the operator places the windage cover 51 over the stages 59, 61. Now built up, the operator secures these sub-assemblies together using the fixture.

A fifth step 109 of the method 100 bonds the sub-assemblies together, such as by welding. Once bonded together, the operator can remove the brush seal 50 from the fixture.

A clear drawback of the conventional method 100 is the requirement to build-up the brush seal stage by stage. Another drawback of the conventional method 100 is the number of components forming the brush seal 50. The two stage brush seal 50 shown in FIGS. 1a-1c requires one windage cover 51, two side plates 53, two back plates 55 and two packs of bristles 63.

The present invention avoids these drawbacks. FIGS. 3a-10 will be used to describe the present invention.

Figure 3B:
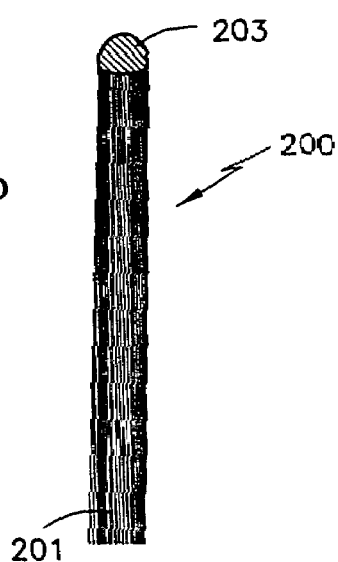

FIGS. 3a and 3b display a bristle arrangement 200 of the present invention. The bristle arrangement 200 includes a plurality of bristles 201 secured together by a joint 203. The bristles 201 could be made from any suitable metallic material, preferably a 0.002", 0.003", 0.004 or 0.006" diameter cobalt alloy wire.

As seen in FIG. 3a, the joint 203 extends continuously along the outer diameter of the circular bristle arrangement 200. Preferably, the operator produces the joint 203 by welding the bristles 201 together. The operator, however, could use other methods to produce the joint 203. As will become clear below, the bristle arrangement 200 defines one stage of bristles in the brush seal 50.

Different shapes of the bristle arrangement 200 are possible. Rather than the annular shape shown in FIGS. 3a and 3b, the bristle arrangement 200 could be arcuate (not shown) or linear (not shown). In fact, the bristle arrangement 200 could have any other shape (not shown). Regardless of the specific shape, the joint 203 should extend along an entire length of the bristle arrangement 200 to retain all of the bristles 201 together.

FIGS. 4-9 display a fixture 300 used to make the bristle arrangement 200. The fixture 300 includes a shuttle 301, a base 303, and a cover 305.

The shuttle 301 receives the base 303 and the cover 305. The shuttle 301 has a bottom wall 307 and a side wall 309 extending therefrom. To create the circular bristle arrangement 200 shown in FIG. 3, the bottom wall 307 and the side wall 309 are preferably circular. The side wall 309 defines the perimeter of the shuttle 301.

An upper end of the side wall 309 includes an annular shoulder 311. A plurality of guides 313 extend from the annular shoulder 311. The guides 313 could be, for example, spring pins or piano wire. As described in more detail below, the guides 313 help the operator place the bristles in the fixture 300. Alternatively, the shoulder 311 could have slots (not shown) therein to receive the bristles.

Figure 5:
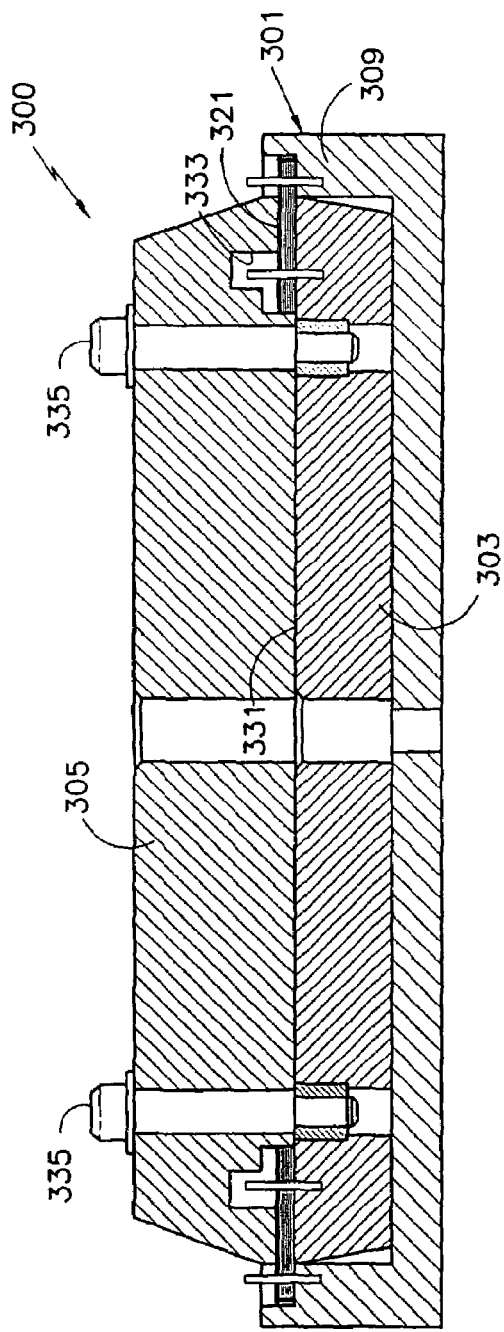
FIG. 5 is a cross-sectional view of the fully assembled fixture at a subsequent step of assembling the bristle arrangement of FIGS. 3a and 3b.

The base 303 fits within the perimeter of the shuttle 301, as seen in FIG. 5. Preferably, the base 303 is removable from the shuttle 301. Ideally, the base 303 sits within the shuttle 301 without using fasteners.

When placed within the shuttle 301, an upper surface 315 of the base 303 is flush with a bottom surface 317 of the shoulder 311. A plurality of guides 319 also extend from the upper surface 315 of the base 303. The guides 319, like guides 313, could be spring pins, piano wire or any other suitable arrangement. The guides 319 also help the operator place the bristles in the fixture 300. Alternatively, the surface 315 could have slots (not shown) therein to receive the bristles.

Figure 4:
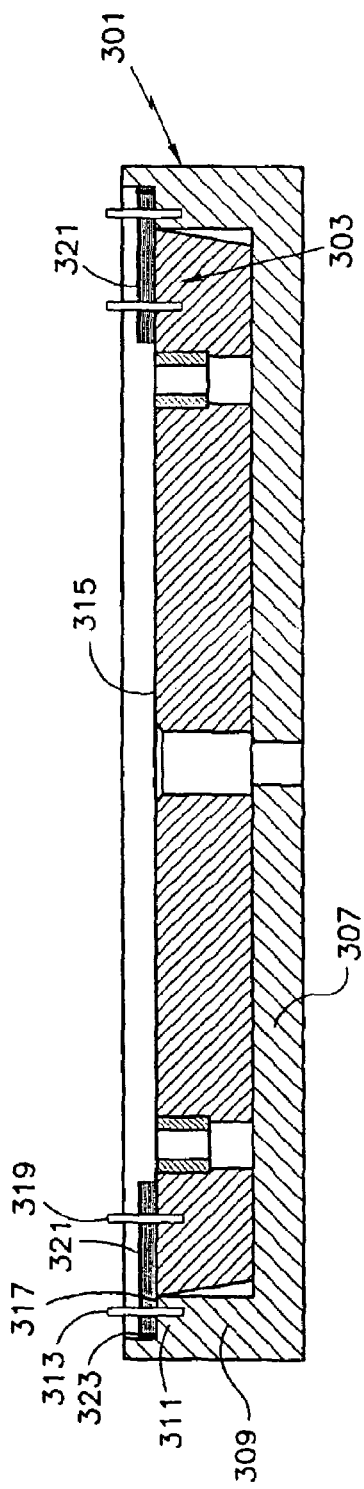
FIG. 4 is a cross-sectional view of a fixture used to assemble the bristle arrangement of FIGS. 3a and 3b during an initial assembly step.
Figure 6:
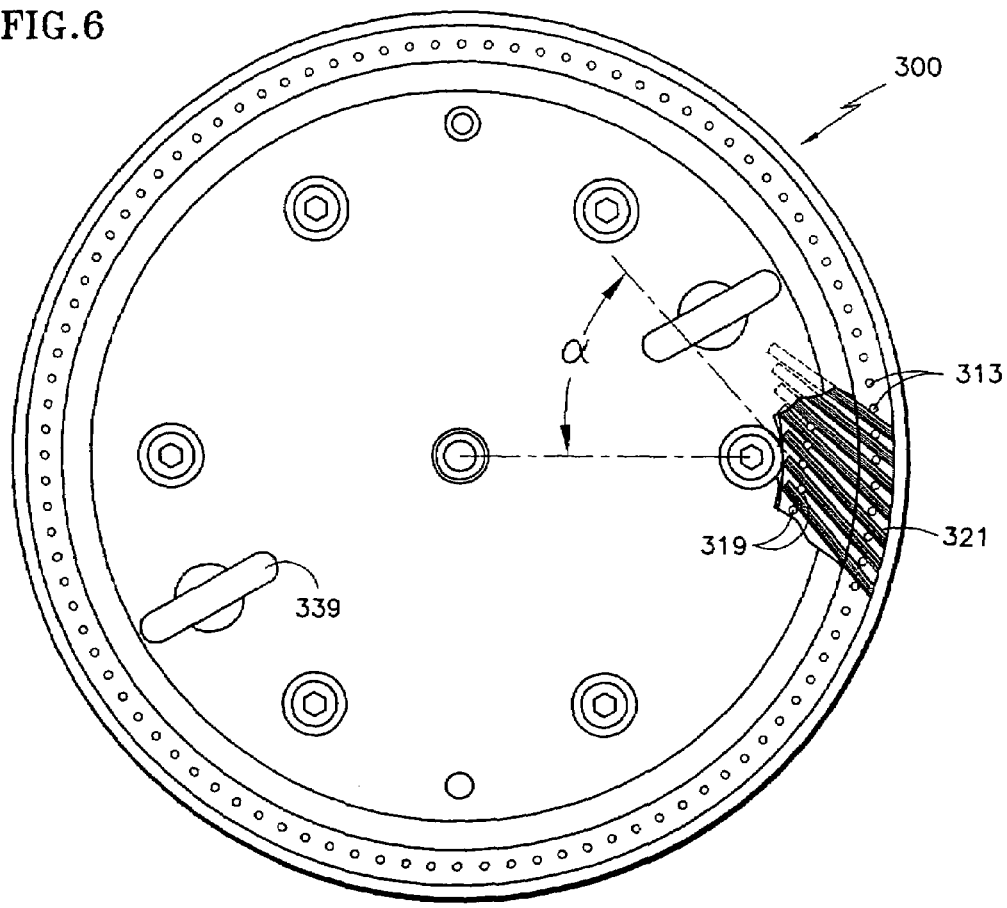
FIG. 6 is a plan view, with partial cut-away, of the fully assembled fixture.

The operator adds bristle tufts 321 to the fixture 300 as seen in FIGS. 4-6. The tuft 321 is a group of bristles 325 (e.g. 0.002", 0.003, 0.004 or 0.006" diameter Cobalt wire) held together by a bead 323. Preferably, the operator has previously formed the tufts 321 using conventional techniques.

The operator places each tuft 321 between adjacent guides 313, 319 in the shuttle 301 and the base 303. As seen in FIG. 6, the operator places the tufts 321 in the fixture 300 in a skewed fashion relative to a line extending radially from the center of the fixture 300. In other words, the bristles extend at an angle a to the radial line . The angle α orients the bristles 325 in the direction that the rotating part of the engine rotates.

As seen in FIG. 4, the beads 323 of the tufts 321 reside to the outside of the fixture 300. For this arrangement, the operator places the beads 323 of the tufts 321 against the annular shoulder 311 of the side wall 309. The operator could, however, arrange the tufts 321 in any other suitable orientation.

Although described as a manual process, the present invention could use automated equipment (not shown) to place the tufts 321 in the fixture 300. Regardless of the placement method, the operator places the cover 305 on the fixture 300 upon placing all of the tufts 321. FIG. 5 displays the fixture 300 with the cover 305 thereon.

The shape of the cover 305 resembles the base 303. The cover 305 includes a bottom surface 331 that abuts portions of the upper surface 315 of the base 303. The bottom surface 331 also includes a recess 333 which, when the cover 305 is on the base 303, creates a receiving area for the tufts 321 and for the guides 319.

Fasteners 335 secure the cover 305 to the base 303. The operator preferably tightens the fasteners 335 with a torque sufficient to spread apart the bristles 325 in a uniform fashion around the fixture 300.

Figure 7:
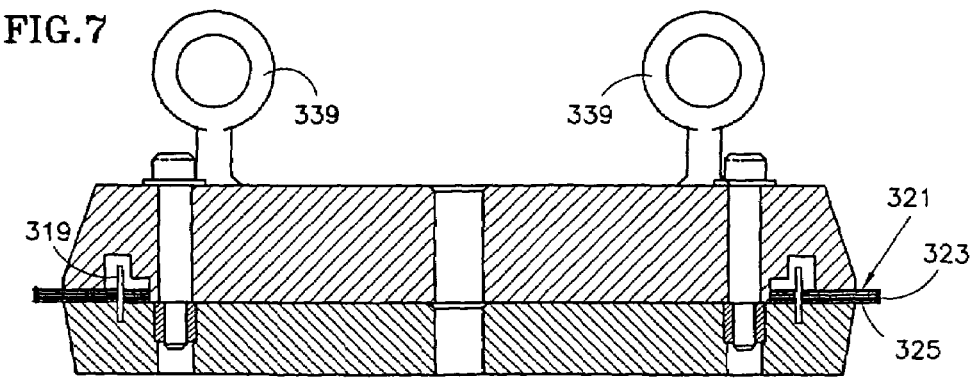
FIG. 7 is a plan view of the fixture at a subsequent step of assembling the bristle arrangement of FIGS. 3a and 3b.

Next, the operator removes the base 303 and cover 305 (containing the tufts 321 sandwiched therebetween) from the shuttle 301. The operator could remove the base 303 and cover 305 by grasping eyebolts 339 or any other suitable feature. FIG. 7 displays the base 303 and cover 305 removed from the shuttle 301.

As seen in FIG. 7, removing the base 303 and cover 305 from the shuttle 201 exposes a portion of the tufts 321 (i.e. the beads 323 and a portion of the bristles 325). The operator can now join together all the bristles 325 at the exposed portions.

Preferably, the operator welds the bristles 325 together with a suitable welding machine, such as a laser welder, a tungsten inert gas (TIG) welder, or an electron beam (EB) welder. However, the present invention could use other suitable techniques to join the bristles 325 together.

At this point, the operator can remove the cover 305 from the base 303 to reveal the result of the aforementioned steps. The result is the bristle arrangement 200 shown in FIGS. 3a and 3b. Being annular, one could refer to the bristle arrangement 200 in the figures as a bristle ring.

Figure 8:
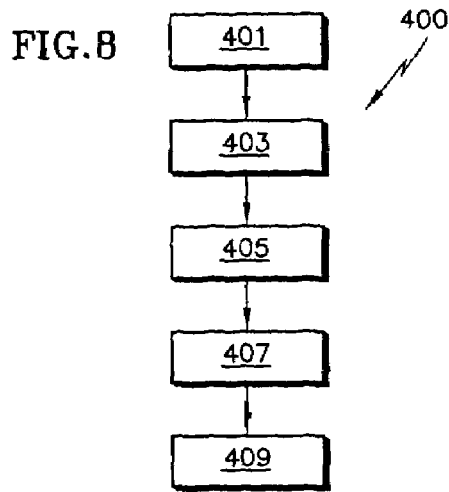
FIG. 8 is a schematic of a method of assembling the bristle assembly of FIGS. 3a and 3b using the fixture shown in FIGS. 4-7.

FIG. 8 schematically summarizes the aforementioned method of making the bristle arrangement 200. The figure provides a method 400 that includes a first step 401 of assembling the fixture 300. As discussed earlier, the operator places the base 303 in the shuttle 301 to accomplish the first step 401.

The operator arranges the tufts 321 in the fixture 300 during a second step 403. As seen in FIG. 6, the tufts 321 form an annulus. As discussed earlier, the operator could arrange the tufts 321 to any other shape (e.g. in an arc or in a line).

The operator then secures the cover 305 to the fixture 300 during a third step 405. Tightening the fasteners 335 spreads the bristles 325 in a uniform fashion around the fixture 300.

The operator then removes the base 303 and cover 305 (with the tufts 321 sandwiched therebetween) from the shuttle 301 during a fourth step 407.

The operator then joins the bristles 325 together during a fifth step 409. The operator preferably welds the bristles 325 together. The result of the method 400 is the bristle ring 200.

The operator can easily handle the bristle ring 200 of the present invention. The bristle ring 200 is now one-piece since the joint 203 secures all of the bristles 201 together. Use of the one-piece bristle ring 200 is easier than the conventional method 100. The conventional method 100 of assembling the brush seal 50 requires the manipulation of a plurality of discrete tufts.

Figure 9A:
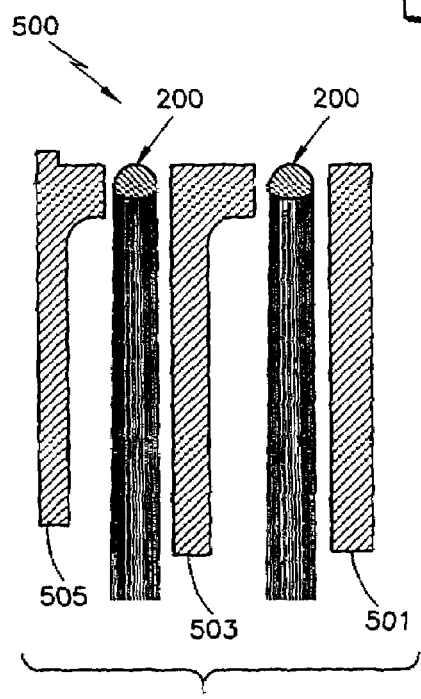
FIG. 9a is an exploded, cross-sectional view showing the various components of a multiple stage brush seal of the present invention.
Figure 9B:
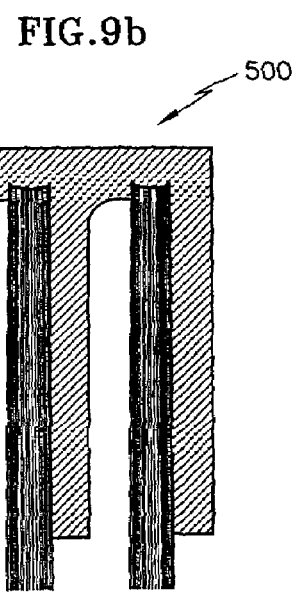
FIG. 9b is a cross-sectional view of the fully assembled brush seal of the present invention.

Using the bristle ring 200 of the present invention also allows the operator to build multiple brush seal stages concurrently. In fact, the present invention allows the operator to build all stages of the brush seal concurrently. FIGS. 9a and 9b display a multiple stage brush seal 500 assembled with bristle rings 200 of the present invention.

Figure 10:
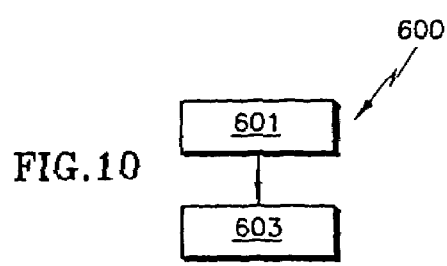
FIG. 10 is a schematic of a method of assembling the multiple stage brush seal of FIG. 9b.

FIG. 10 schematically demonstrates a method 600 of assembling the brush seal 500.

In a first step 601, the operator assembles all of the components of the brush seal 500 within a fixture (not shown). The operator first places a back plate 501 in the fixture. The operator then places a first bristle ring 200 on the back plate.

Next, the operator places a middle plate 503 over the bristle ring 200. Comparing the brush seal 500 and the brush seal 50 in FIG. 1c, the one-piece middle plate 503 of the brush seal 500 equates to both the side plate 53 and the back plate 55 of the conventional brush seal 50. The operator can utilize the single middle plate 503 since the present invention does not build up the brush seal stages discretely. Rather, the present invention assembles the brush seal 500 in one step.

The operator then places a second bristle ring 200 over the middle plate 503. Finally, the operator places a windage cover 505 over the middle plate 503. Comparing the brush seal 500 and the brush seal 50 in FIG. 1c, the one-piece windage cover 505 of the brush seal 500 equates to both the side plate 53 and the windage cover 51 of the conventional brush seal 50. Again, the operator can utilize the single windage cover 505 because the present invention does not build up the brush seal stages discretely. Rather, the present invention assembles the brush seal 500 in one step.

The operator uses the fixture to hold these components together for the next step of the method 600.

A second step 603 of the method 600 bonds the entire brush seal 500 together at one time. Preferably, the operator fusion welds the components 501, 200, 503, 200, 505 together. The operator could use the same welder as used in the sixth step 411 of the bristle ring assembly method 400. If needed, the welder could provide filler material during this second step 603.

Once bonded, the operator can remove the brush seal 500 from the fixture.

The result of the method 600 is the brush seal 500 of FIGS. 11a and 11b. Although described with reference to multiple stage brush seals 500, the bristle ring 200 of the present invention could also be used in single stage brush seals (not shown).

The brush seal is ultimately installed in the engine. Depending upon the rotation direction of the engine, the operator can either place the bristle ring 200 in the fixture for clockwise or for counterclockwise rotation. The operator merely flips the bristle ring 200 over to change the rotation direction.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method of making a bristle arrangement for subsequent use in a brush seal, comprising the steps of:
arranging a plurality of bristles along a length;
joining essentially just said plurality of bristles along said length;
said arranging and joining steps using an apparatus comprising:

a base having a surface with an arrangement of guides thereon, said guides adapted to orient said bristles on said surface for the arranging step; and a cover having a surface for receiving said bristles;

wherein said cover removably mounts to said base to sandwich said bristles between said base and said cover for the joining step.

2. The method as recited in claim 1, wherein said apparatus further comprises a shuttle, said shuttle removably receiving said base and having an arrangement of guides thereon corresponding to said guides on said base for orienting said bristles in the arranging step.

3. The method as recited in claim 1, wherein said joining step comprises joining only said plurality of bristles together to form a ring of bristles.

4. The method as recited in claim 3, wherein said joining step comprises welding an outer end portion of said plurality of bristles together.

5. A method of making a bristle arrangement for subsequent use in a brush seal, comprising the steps of:

providing an apparatus having a base with a surface with an arrangement of guides thereon that are adapted to orient a plurality of bristles on said surface and a cover having a surface for receiving said bristles, said cover removably mounting to said base to sandwich said bristles between said base and said cover;

arranging a plurality of bristles along a length in said guides; and joining together only said plurality of bristles along said length.

6. The method as recited in claim 5, wherein said apparatus providing step comprises providing a shuttle removably receiving said base and an arrangement of guides thereon corresponding to the guides on said base and said arranging step comprising placing said bristles in said guides on said base and said guides on said shuttle.

7. The method as recited in claim 6, wherein said placing step comprises placing said bristles in a skewed fashion relative to a line extending radially from a center of the apparatus.

8. The method as recited in claim 5, wherein said joining step comprises forming a joint which extends continuously along an outer diameter of a circular arrangement of said bristles.

9. The method as recited in claim 5, wherein said joining step comprises joining only exposed portions of said bristles.

10. The method as recited in claim 5, wherein said joining step comprises welding said bristles together.

11. The method as recited in claim 5, further comprising removing said cover from said base and removing only said joined bristles from said base.

* * * * *